United States Patent
Patel et al.

(10) Patent No.: US 9,473,573 B2
(45) Date of Patent: Oct. 18, 2016

(54) NETWORK FOLLOWED BY COMPUTE LOAD BALANCING PROCEDURE FOR EMBEDDING CLOUD SERVICES IN SOFTWARE-DEFINED FLEXIBLE-GRID OPTICAL TRANSPORT NETWORKS

(71) Applicant: NEC Laboratories America, Inc., Princeton, NJ (US)

(72) Inventors: Ankitkumar N. Patel, East Brunswick, NJ (US); Philip Nan Ji, Princeton, NJ (US)

(73) Assignee: NEC Corporation (JP)

( * ) Notice: Subject to any disclaimer, the term of this patent is extended or adjusted under 35 U.S.C. 154(b) by 287 days.

(21) Appl. No.: 14/317,156

(22) Filed: Jun. 27, 2014

(65) Prior Publication Data

US 2015/0046592 A1 Feb. 12, 2015

Related U.S. Application Data

(60) Provisional application No. 61/863,001, filed on Aug. 7, 2013.

(51) Int. Cl.
H04L 29/08 (2006.01)
H04L 12/803 (2013.01)

(52) U.S. Cl.
CPC .................... *H04L 67/1036* (2013.01)

(58) Field of Classification Search
CPC ..... H04L 45/64; H04L 45/02; H04L 45/126; H04L 45/1283; H04L 45/302; H04L 45/42; H04L 41/12; H04L 67/1036; H04L 47/125; H04J 14/0027; H04J 14/0254; H04J 14/0257; H04J 14/0258; H04J 14/026; H04J 14/0264; H04J 14/0267; H04J 14/0269; H04J 14/0271; H04Q 1/0001
USPC .................... 709/226; 370/236, 238, 255, 79
See application file for complete search history.

(56) References Cited

U.S. PATENT DOCUMENTS

| | | | |
|---|---|---|---|
| 2009/0046733 A1* | 2/2009 | Bueno ................... | H04L 12/467 370/409 |
| 2009/0324222 A1* | 12/2009 | Kunjidhapatham .... | H04L 45/02 398/58 |
| 2010/0214913 A1* | 8/2010 | Kompella ........... | H04L 12/5695 370/230 |
| 2011/0029675 A1* | 2/2011 | Yeow .................. | G06F 11/2041 709/226 |
| 2013/0103817 A1* | 4/2013 | Koponen ............ | G06F 9/45558 709/223 |
| 2014/0052949 A1* | 2/2014 | Wang .................. | H04L 43/0817 711/162 |
| 2014/0098673 A1* | 4/2014 | Lee ........................ | H04L 45/64 370/238 |
| 2014/0099118 A1* | 4/2014 | Zhang ................. | H04J 14/0257 398/79 |
| 2014/0099119 A1* | 4/2014 | Wei ...................... | H04J 14/0257 398/79 |
| 2014/0233956 A1* | 8/2014 | Zami ...................... | H04J 14/02 398/79 |
| 2014/0307556 A1* | 10/2014 | Zhang ................... | H04L 45/302 370/236 |
| 2014/0379927 A1* | 12/2014 | Patel ...................... | H04L 45/12 709/226 |
| 2015/0220740 A1* | 8/2015 | Patel ...................... | H04L 67/10 726/26 |

OTHER PUBLICATIONS

Calheiros et al, "A Heuristic for Mapping Virtual Machines and Links in Emulation Testbeds," IEEE, 2009 International Conference on Parallel Processing, Sep. 2009.*

* cited by examiner

*Primary Examiner* — Alina N Boutah
(74) *Attorney, Agent, or Firm* — Joseph Kolodka

(57) ABSTRACT

A method for providing cloud embedding using Network followed by Compute Load Balancing (NCLB) by mapping one or more virtual links over one or more physical links while balancing network resources, and mapping one or more virtual nodes over one or more physical nodes while balancing different types of computational resources.

11 Claims, 4 Drawing Sheets

NETWORK FOLLOWED BY COMPUTE LOAD BALANCING PROCEDURE FOR EMBEDDING CLOUD SERVICES IN SOFTWARE-DEFINED FLEXIBLE-GRID OPTICAL TRANSPORT NETWORKS

This application claims priority from Provisional Application 61863001 filed Aug. 7, 2013, the content of which is incorporated by reference.

BACKGROUND

Software-Defined Network (SDN) architecture enables network programmability to support multi-vendor, multi-technology, multi-layer communications, and to offer an infrastructure as a service. Recently, efforts are going on to integrate optical transport within IP/Ethernet-based SDN architecture to leverage optical transmission benefits, such as low interference, long reach, and high capacity transmission with lower power consumption. Such a network is referred to as Optical Transport SDN. Optical transport SDN can be realized by enabling flexibility and programmability in transmission and switching network elements, such as transponders and ROADMs, management of optical channels, such as flexible-grid channel mapping, and extracting control plane intelligence from the physical hardware to the centralized controller.

Cloud service embedding consists of virtual node embedding and virtual link embedding sub-problems. If the virtual nodes are per-assigned to physical nodes, then the problem of just mapping virtual links over physical links is referred to as virtual network embedding problem. The virtual network embedding problems have been extensively solved for IP/Ethernet-based networks while ignoring optical transport. Recently, the virtual network embedding problem is solved for fixed grid and flexible grid optical transport networks respectively.

Recently, cloud services have gained interests since it supports applications by sharing resources within existing deployed infrastructure instead of building new ones from scratch. These days network applications are becoming more and more cloud centric, for example social networking applications, such as FaceBook, Twitter, and Google+, e-science applications, such as Large Hadron Collider, content applications, such as NetFlix, and search applications, such as Google and Baidu. Cloud applications are supported by interconnecting various computing, storage, software, and platform-oriented resources within data centers through networks. Each data center is built with the goal of optimizing the type of services offered, for example Google data center is built with the goal of efficient indexing of web pages and minimization of content search time, while Facebook data center is built to offer maximum storage for user contents and efficient management and linking of these contents within user's social group, Amazon EC2 data center is built to offer faster computing time. Thus, one data center may not provide all types of resource, and may not optimally meet all the requirements of a cloud application. In such scenarios, open challenges are how to map a cloud request among data centers offering heterogeneous resources, and how to establish network connectivity between data centers.

SUMMARY

We designed an efficient procedure, namely Network Depth Limited Compute Followed by Network Load Balancing (ND-CNLB), which partitions the physical network into many sub-networks, and limits the mapping of cloud demands within one of the sub-networks to avoid over provisioning of resources.

Advantages of this aspect may include one or more of the following.

In another aspect, a process named Network followed by Compute Load Balancing (NCLB) first maps virtual links over physical links while balancing network resources, and finally, maps virtual nodes over physical nodes while balancing different types of computational resources.

Advantages of this aspect may include one or more of the following. The NCLB procedure embeds the maximum number of cloud demands compared to the existing solutions. The procedure is applicable in the optical control plane, such as Path Computation Element (PCE) and as an application in a software-defined controller. The application of this procedure can embed cloud demands within practical time limits, and thus enhance software defined transport optical network performance. The method can dramatically improve the cloud service embedding performance since it first performs network load balancing while avoiding over-provisioning of network resources. In this novel method, the procedure intelligently finds potential modulation formats and routing solutions while ensuring the reachability constraints. The procedure intelligently selects a modulation format and a route for a VL such the VL can be successfully provisioned with higher probability while achieving network load balancing in the network.

DESCRIPTION

Figure 1:
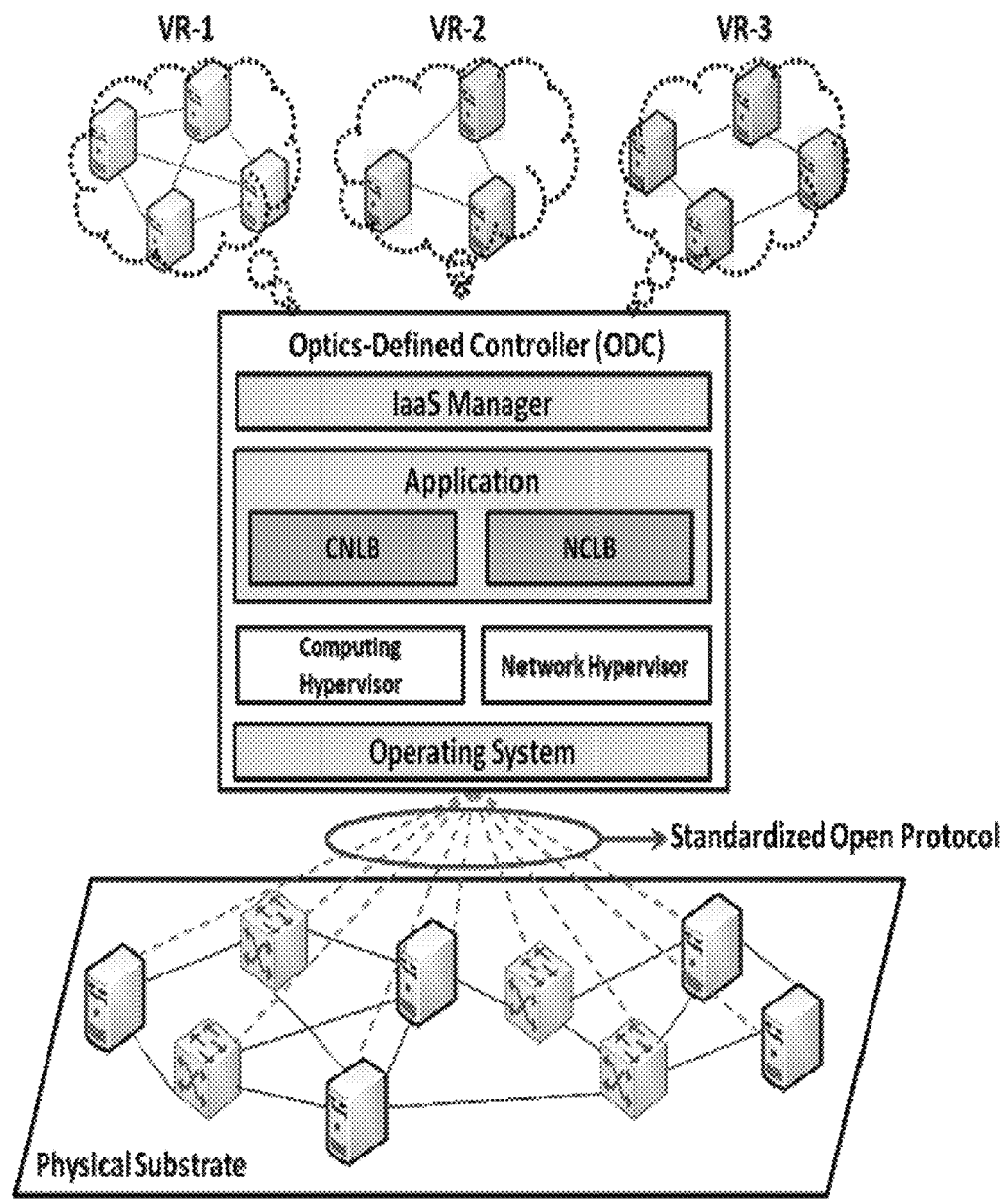
FIG. 1 shows an exemplary Architecture of Optical Transport SDN.

FIG. 1 shows architecture for optical transport SDN in which control plane is abstracted from physical hardware of network elements and most network control and management intelligence now resides into a centralized controller. The centralized controller controls network elements using a standardized protocol, such as OpenFlow over standardized interfaces at controller and network elements. The control plane decisions present in the form of rules, actions, and policies, and network elements applies these decision based on match-action on connections. Thus, optical transport SDN partitions a network into software defined optics (SDO) and optics defined controller (ODC).

Software-defined optics consists of variable rate transponders, flexible-grid channel mapping, and colorless-directionless-contentionless-gridless (CDCG) ROADMs. Variable-rate transponder can be programmed for various modulation formats and FEC coding. Thus, transponders can offer variable transmission capacity for heterogeneous reach requirements. Flexible-grid channel mapping allows an assignment of flexible amount of spectrum to channels to achieve higher spectral efficiency by applying spectrum-efficient modulation formats and eliminating guard bands. CDCG-ROADM can be programmed to switch connections operating on any wavelength with any spectral requirement over any outgoing direction. Furthermore, connections can be added and dropped at a node without contentions. These hardware and their features establishes foundation of SDON optimization and customization capabilities.

Optics defining controller manages the network, and performs network optimization and customization to utilize flexibility of SDO. ODC functionalities are further extracted into network/compute hypervisor, operating system, network applications and database, and debugger and management planes. These planes are isolated by open standardized interfaces to allow simultaneous and rapid innovations at each layer independently. Various control plane functionalities, for example, cloud resource mapping, routing and resource allocation, protection and restoration, defragmentation, energy optimization, etc., are installed as applications and data base in the ODC. Network/compute hypervisor offers virtualization by providing isolation and sharing functions to a data plane as well as an abstract view of network and computing resources while hiding physical layer implementation details to a controller in order to optimize and simplify the network operations. Operating system offers a programmable platform for the execution of applications and hypervisors. Debugger and management plane offers access control and QoS management, while monitoring network performance, and performs fault isolation, localization, and recovery.

A centralized controller consists of an open-protocol control plane engine that configures physical resources and updates their state information using open-protocol commands. A network operating system provides programmable platform to computing and network hypervisors, and network and management applications. Computing and network hypervisors offer virtualization by offering isolation and sharing of physical devices among multiple cloud demands, and hides physical implementation details from cloud applications. Various cloud applications, such as ND-CLB and ND-NLB, are supported within these hypervisors to provision cloud demands. A controller manages infrastructure, software, platform, and network resources using IaaS, SaaS, PaaS, and NaaS managers, and maintains application and network resources state information in an application management information base (A-MIB) and a network management information base (N-MIB). Configuration information of cloud demands is maintained in a configuration data base, and network's traffic engineering information is maintained in a TE data base. Cloud administrative engine maintains accounting, administrative, and authentication information for clients.

We are given a physical substrate, $G(V, E, C_j^v)$, where V is a set of nodes, E is a set of fibers, and $C_j^v$ is the number of computing resources of type j at node $v \in V$, where j=1, 2, 3, ..., J. Spectral capacity of a fiber is Z GHz. The network supports a set of modulation formats, M. The spectral efficiency and transmission reach of each modulation format $m \in M$ is $x_m$, b/s/Hz and $d_m$ Km respectively. A cloud demand is defined as $R(G(N, L), C_j^N, Y_L)$, where N represents a set of virtual nodes, L represents a set of virtual links, $C_j^N$ represents the number of required computational resources of type j at node $n \in N$, $Y_L$, represents the requested line rate on link $l \in L$. We are given arrival and departure distributions of such cloud demands. The problem is how map a set of Virtual Nodes (VNs) over Physical Nodes (PNs) while provisioning the requested number of computational resources, and how to map virtual links (VLs) over physical routes while provisioning the requested line rates, such that the number of embedded cloud demands is maximized. While embedding cloud demands over physical substrates, we need to ensure that the same computational and network resources cannot be shared by multiple cloud demands at the same time.

We disclose ND-CLB and ND-NLB algorithms in which the physical network is partitioned into sub-networks with parameter (p, q), where p represents a center node and q represents the depth of a sub-network. Network depth q with respect to node p is defined as the maximum number of hops from the node p to any node in the network. Thus, a sub-network is formed by considering interconnection of all network nodes those are at most q hops away from the center node p. In the next step, the procedure select a sub-network (p, q) that has the maximum average ratio of available to total offered computational resources. The ND-CLB and ND-NLB algorithms maps the cloud demand in this selected sub-network using computing load balancing and network load balancing procedures respectively. If the cloud demand is successfully mapped in the selected sub-network, then the algorithm terminates, otherwise the algorithm selects an unconsidered sub-network with the same parameter (p, q). If all the sub-networks with parameters (p, q) are considered, then the algorithm increments the network depth by one hop, and repeats the same process until the maximum network diameter $D_{max}$ is considered, where $D_{max}$ is the maximum number of hops between a pair of nodes in the network. Finally, if the cloud demand is not yet mapped over any of the sub-networks, then the demand is blocked.

In the computing load balancing procedure, first VNs are mapped in a descending order of the total requested different types of resources. A VN is mapped onto a PN that has the maximum cumulative ratio of available to offered resources of all types. If a VN cannot be mapped on any PN, the process is terminated. If all VNs are mapped, then the algorithm starts mapping VLs one-by-one as follows. To establish a VL between the PNs on which the VNs are mapped, the algorithm finds the probability of mapping the VL on each of the K shortest physical routes using each of the potential modulation formats that meets the reachability constraint. Finally, a route and a modulation format is selected with the maximum probability, and the VL is provisioned along this selected route using the found modulation format at spectrum that is available at the lowest wavelength. If at least one of the VLs cannot be mapped, then the process is terminated.

In the network load balancing procedure, first VLs are mapped in a descending order of the requested line rate. For the selected VL, the algorithm finds a set of PNs for each VN of the VL, which have at least the requested number of computing resources of each type. If at least one of the VNs of the VL has already been mapped, then the algorithm needs to consider a set of PNs only for a VN that is not yet mapped while keeping the PN of the mapped VN fixed. If any set of PNs is empty, then the algorithm terminates, otherwise, once the sets of PNs are found for the VNs of the VL, the procedure considers all combinations of node pairs from both this sets and finds the probability of mapping the VL on each of the K shortest physical routes using each of the potential modulation formats that meets the reachability constraint. Finally, PNs, a route connecting these PNs, and a modulation format is selected with the maximum probability, and the VL is provisioned along this route using the found modulation format over spectrum that is available at the lowest wavelength. The procedure finally maps the VNs of the VL to the respective PNs. If at least one of the VLs cannot be mapped, then the process is terminated.

The problem is referred to as cloud service embedding problem. In this invention, we investigate cloud service embedding problem over software-defined flexible grid transport SDN networks. The problem is formally defined as follow.

In one embodiment, we are given a physical network topology G(N, L), where N represents a set of physical nodes (PNs) and L represents a set of physical links (PLs) interconnecting physical nodes. Each node offers different types resources, for example, 1, 2, 3, . . . , n, and the number of offered resources $C_j^n$ for each type j is given in advance. A node also consists of CDCG-ROADMs and variable rate transponders. CDCG-ROADM offers switching of flex-grid optical connections while variable rate transponders offer a set of modulation formats M, where the spectral efficiency $Z_m$ bit/second/Hz and transmission reach $D_m$ Km of each modulation format m is also given. A fiber offers total T THz of spectrum. A cloud demand is defined as G'(V, E, C, L), where V is a set of virtual nodes (VNs), E is a set of virtual links (VLs) connecting virtual nodes, C is a set of requested resources ($C_i^1, C_i^2, \ldots, C_i^n$) at each virtual node i, L is a set of requested line rate $I_{ij}$, between virtual nodes i and j. The arrival and departure distributions of cloud requests are given. The problem is how to map virtual nodes of a cloud demand over physical nodes (the virtual node embedding problem) and virtual links of a cloud demand over physical links (the virtual link embedding problem), such that the number of embedded cloud demands is maximized. Virtual link embedding problem consists of sub-problems such as how to route a virtual link over physical routes, how to assign a wavelength and allocate spectrum, and how to select a modulation format. It is assumed that a network does not support wavelength, spectrum, or modulation format conversion capability.

Cloud embedding mainly consists of virtual node embedding and virtual link embedding. Since physical node and link resources are shared among multiple could demands, an embedding procedure needs to ensure isolation of these resources while maintaining the resource capacity constraints. When mapping virtual nodes over physical nodes, a procedure needs to ensure that different virtual nodes cannot be mapped over the same physical node. When mapping virtual links over physical routes through optical channels in flex-grid transport SDN, a procedure needs to ensure the wavelength continuity, and spectral continuity, spectral conflict. The wavelength continuity constraint is defined as an allocation of spectrum at the same operating wavelength on all links along the route of an optical channel. The spectral continuity constraint is defined as an allocation of the same amount of spectrum on all links along the route of an optical channel. The spectral conflict constraint is defined as an allocation of non-overlapping spectrum to all channels routed through the same fiber. Furthermore, a procedure also needs to make sure that a selection of modulation format for a virtual link and its routing over the network should support at least the physical Euclidean distance between the physical nodes on which virtual nodes are mapped. The constraint is referred to as the reachability constraint.

Figure 2:
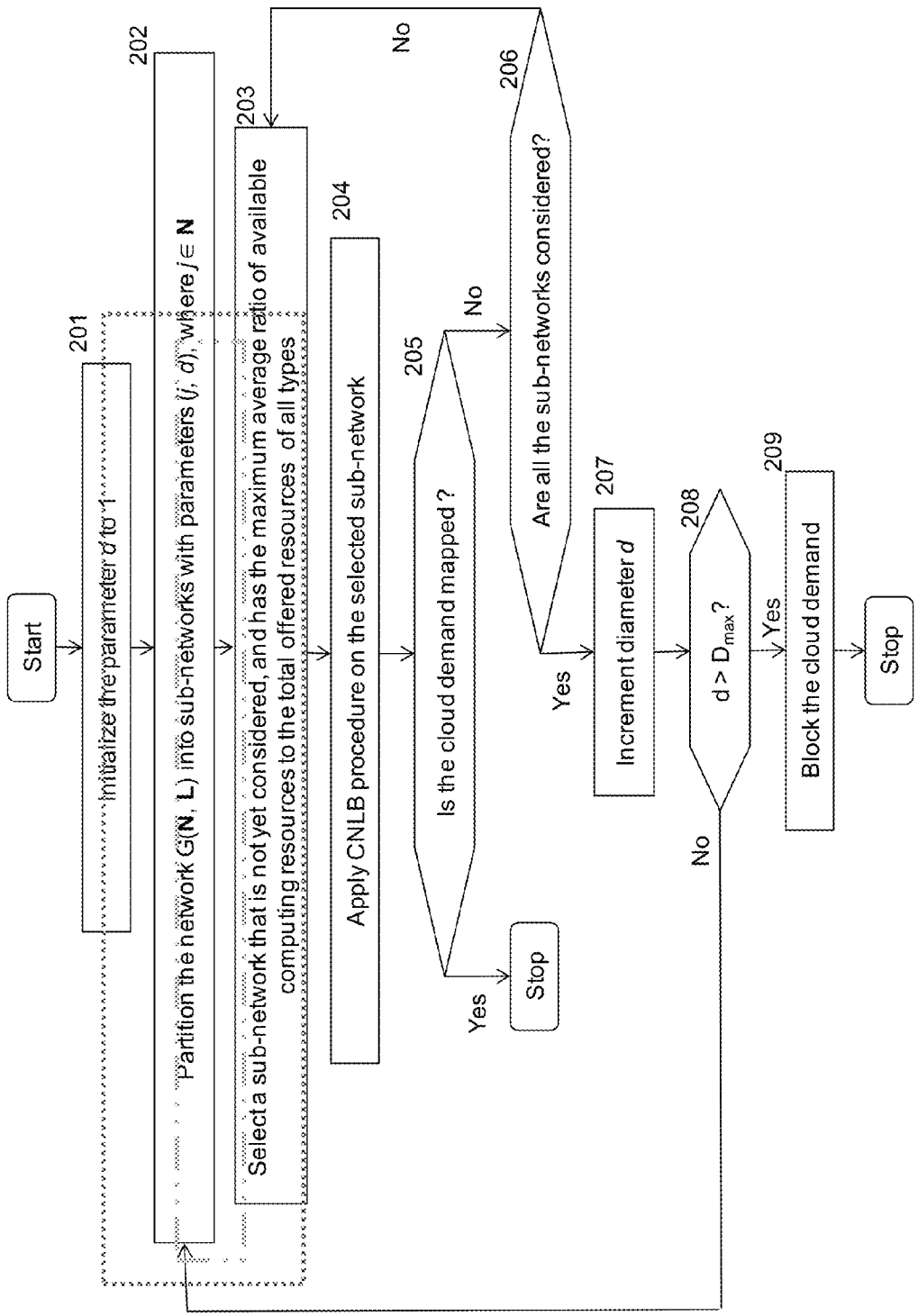
FIG. 2 shows an exemplary Flowchart of the ND-CNLB Procedure.
Figure 3:
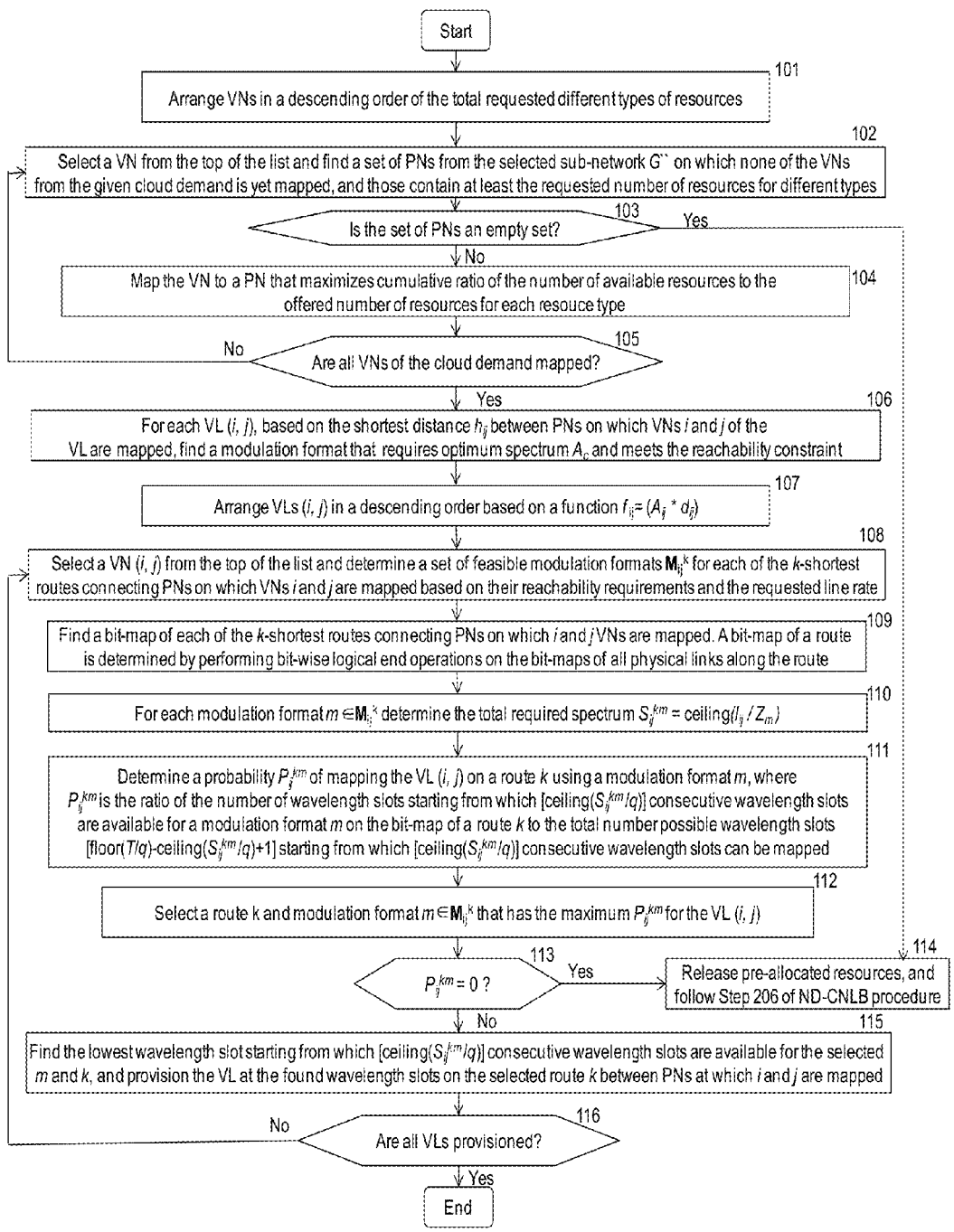
FIG. 3 shows an exemplary Flowchart of the CNLB procedure.

FIG. 2 shows an exemplary Flowchart of the ND-CNLB Procedure, while FIG. 3 shows an exemplary Flowchart of the CNLB procedure. The procedure partitions the physical network G(N, L) into sub-networks with parameter (j, d), where j∈N represents a center node, and d represents the depth of a sub-network. Network depth is defined as the maximum number of hops from the center node j to any node in the network. A sub-network is formed by considering interconnection of all the network nodes those are at most d hops (sub-network depth) away from the center node j. The procedure partitions the physical network into the maximum |N| sub-networks.

In the next step, the procedure selects a sub-network G"(A, P) that has the maximum average ratio of available resources to the total offered resources of all types, where A denotes a set of physical nodes, and P denotes a set of physical links. Over the selected sub-network, the procedure applies CNLB procedure [IR-CNLB] as follows.

In the CNLB procedure, to reduce the management complexity, the spectrum is slotted at the granularity of q GHz. A slot is referred to as a wavelength slot. Thus, spectrum can be represented by a set of consecutive wavelength slots, and among them, the first wavelength slot index is denoted as the wavelength of an optical channel. Thus, the network consists of total ceiling(T/q) wavelength slots [Note: ceiling(.) and floor(.) indicate ceiling and floor mathematical operations respectively over the value confined within a bracket]. The state of each wavelength slot is represented by a binary variable; '1' indicated that the wavelength slot is available and '0' indicates that the wavelength slot is occupied. The spectrum state of a fiber is represented by a binary vector that is referred to as a bit-map of a fiber.

The procedure pre-calculates up to k-shortest routes between each pair of nodes in the given physical network G(N, L). The procedure first maps virtual nodes (VNs) over the physical nodes (PNs) of sub-network G"(A, P), where A⊂N is a set of physical nodes and P⊂L is a set of physical links, while performing load balancing over node resources. VNs are arranged in a descending order of the total required different types of resources. These VNs are mapped over the PNs of sub-network G" one-by-one in a descending order. A VN can be mapped to a PN on which none of the VNs from the given cloud demand is yet mapped, and the PN must contain at least the required number of different types of resource requested by the VN. Among these PNs of sub-network G", a PN is selected that has the maximum ratio of the number of available resources to the total number of resources for the maximum number of different types of resources. If at least one of the VNs cannot be mapped, then the procedure selects the next sub-network that is not yet considered. If all the sub-networks are considered with parameters (j, d), where j∈N, the procedure increments the depth d. If the new depth d is smaller than or equal to the depth of the given network G(N, L), $D_{max}$, then the procedure repartitions the given network into sub-networks with parameters (j, d), otherwise the procedure blocks the cloud demand and terminates.

If the VNs are mapped on the sub-network, then the procedure performs the following operations to map VLs over the physical links of the sub-network while performing load balancing over network resources. For each VL (i, j), the procedure first estimates the required amount of spectral resources $f_{ij}$, which is defined as the product of the shortest distance in terms of hops $d_{ij}$ between PNs over which i and j VNs are mapped, and minimum required spectrum $A_{ij}$, $A_{ij}$ is determine from the highest spectral efficient modulation format that can reach at least $h_{ij}$ distance, where $h_{ij}$ is the physical (Euclidean) distance in terms of Km between VNs i and j. The procedure arranges VLs in a descending order of the estimated required spectrum, and maps these VLs in a one-by-one manner as follows.

The procedure determines a set of feasible modulation formats $M_{ij}^k$ for each of the k-shortest routes connecting PNs on which VNs i and j are mapped based on their reachability requirements. In the next step, the procedure determines the probability $P_{ij}^{km}$ of mapping the VL (i, j) over a physical route k using a modulation format m is determined. To determine this probability, the procedure first finds a bit-map of each of the k-shortest routes connecting PNs on which VNs i and j are mapped. A bit-map of a route is determined by performing bit-wise logical end operations on the bit-maps of all physical links along the route. Afterwards, the procedure determines the required spectrum $S_{ij}^{km}$=ceiling $(I_{ij}/Z_m)$ to support the line rate $I_{ij}$ over route k using modulation format m. In the next step, the procedure finds the number of wavelength slots starting from which at least [ceiling($S_{ij}^{km}$/q)] number of consecutive slots is available in the bit-map of a route k. The ratio of the found number of wavelength slots to [floor(T/q)−ceiling($S_{ij}^{km}$/q)+1] represents the probability $P_{ij}^{km}$, where [floor(T/q)−ceiling($S_{ij}^{km}$/q)+1] represents the total number of potential wavelength slots starting from which at least [ceiling($S_{ij}^{km}$/q)] number of consecutive wavelength slots available. In the next step, the procedure selects a route k and modulation format m that maximizes the probability $P_{ij}^{km}$. if $P_{ij}^{km}$=0, then the procedure releases pre-allocated node and link resources, and selects the next sub-network that is not yet considered. If all the sub-networks are considered with parameters (j, d), where j∈N, the procedure increments the depth d. If the new depth d is smaller than or equal to the depth of the given network G(N, L), $D_{max}$, then the procedure repartitions the given network into sub-networks with parameters (j, d), otherwise the procedure blocks the cloud demand and terminates. If $P_{ij}^{km}$>0, the procedure finds the lowest wavelength slots at which [ceiling($S_{ij}^{km}$/q)] number of consecutive wavelength slots are available for the selected k and m, and provisions the VL at the found wavelength slots on the selected route k for the modulation format m. Finally, the procedure checks whether all VLs are provisioned or not. If at least one of the VLs is not yet provisioned, then the procedure repeats the procedure of VL mapping in the same sub-network G". If all the VLs are mapped in the sub-network, then the process is terminated.

The ND-CNLB procedure is described in terms of the flow chart as shown in FIG. 2. In 201, the procedure initializes the depth d of a sub-network to be 1. In 202, the procedure partitions the given network G(N, L) into sub-networks with parameter (j, d), where j∈N represents the center node of a sub-network, and d represents the depth of a sub-network. Thus, all nodes within these sub-networks are at most d hops away from the center node j. The procedure generates total |N| sub-networks. In 203, the procedure selects a sub-network that is not yet considered, and has the maximum average ratio of the available computing resources to the total offered resources for all types. This operation balances the occupied and available computing resources over the physical network. In 204, the procedure applies the CNLB procedure to map the virtual nodes and virtual links of the cloud demand over the selected sub-network G". In 205, the procedure checks weather the cloud demand is mapped or not. If the cloud demand is mapped in the selected sub-network G", then the procedure terminates, otherwise the procedure follows Step 206.

In 206, the procedure checks weather all sub-networks with parameters (j, d) considered or not. If at least one of the sub-networks is not yet considered, then the procedure follows Step 203. If all sub-networks are considered with parameters (j, d), then the procedure follows Step 207. In 207, the procedure increments the depth d. In 208, the procedure checks weather the new depth d is larger than the maximum depth $D_{max}$ of the given network G(N, L), where $D_{max}$ is the maximum hop count of the shortest route between any pair of nodes in the given network G. If the new depth d is smaller than $D_{max}$, then the procedure follows Step 202, otherwise the procedure follows Step 209. In 209, the procedure blocks the cloud demand, and terminates.

An exemplary CNLB procedure is described as a flowchart as shown in FIG. 3. In 101, the procedure arranges VNs of the given cloud request in a descending order of the total requested different types of resources.

In 102, the procedure finds a set of PNs from the selected sub-network G" on which none of the VNs of the given cloud demand is yet mapped, and these nodes contains at least the requested number of resources of different types by the VN. In 103, the procedure checks whether the set of PNs is empty or not. If the set is empty, then the procedure follows Step 114. If the set if not empty, then the procedure follows Step 104. In 104, the procedure maps the VN to a PN that maximizes cumulative ratio of the number of available resources to the offered number of resources for each resource type. In 105, the procedure checks whether all VNs of the given cloud demand are mapped. If at least one of the VNs is not yet mapped, then the procedure follows Step 102, otherwise the procedure follows Step 106. In 106, for each VL (i, j), based on the shortest distance $h_{ij}$ between PNs on which VNs i and j of the VL are mapped, the procedure finds a modulation format that requires optimum spectrum $A_o$ and meets the reachability constraint. In 107, the procedure arranges VLs of the cloud request in a descending order according to function $f_{ij}=(A_{ij}*d_{ij})$. In 108, the procedure selects a VN (i, j) from the top of the list, and determines a set of feasible modulation formats $M_{ij}^k$ for each of the k-shortest routes connecting PNs on which VNs i and j are mapped based on their reachability requirements and the requested line rate. In 109, the procedure finds a bit-map of each of the k-shortest routes connecting PNs on which i and j VNs are mapped. A bit-map of a route is determined by performing bit-wise logical end operations on the bit-maps of all physical links along the route. In 110, for each modulation format m∈$M_{ij}^k$, the procedure determines the total required spectrum $S_{ij}^{km}$=ceiling($I_{ij}/Z_m$). In 111, the procedure determines a probability $P_{ij}^{km}$ of mapping the VL (i, j) on a route k using a modulation format m, where $P_{ij}^{km}$ is the ratio of the number of wavelength slots starting from which [ceiling($S_{ij}^{km}$/q)] consecutive wavelength slots are available for a modulation format m on the bit-map of a route k to the total number possible wavelength slots [floor (T/q)−ceiling($S_{ij}^{km}$/q)+1] starting from which [ceiling($S_{ij}^{km}$/q)] consecutive wavelength slots can be mapped.

In 112, the procedure selects a route k and modulation format m∈$M_{ij}^k$ that has the maximum $P_{ij}^{km}$ for the VL (i, j). In 113, the procedure checks whether the maximum probability $P_{ij}^{km}$ is 0 or not. If it is 0, then the procedure follows Step 114, otherwise the procedure follows Step 115. In 114, the procedure releases the pre-allocated node and spectral resources within the sub-network G", and follows Step 206 of the ND-CNLB procedure. In 115, the procedure finds the lowest wavelength slot starting from which [ceiling($S_{ij}^{km}$/q)] number of consecutive wavelength slots are available for the selected m and k, and provisions the VL at the found wavelength slots on the selected route k between PNs at which i and j are mapped. In 116, the procedure checks whether all VNs are already mapped or not. If at least one of the VNs is not yet mapped, then the procedure follows Step 108, otherwise the procedure is terminated.

Figure 4:
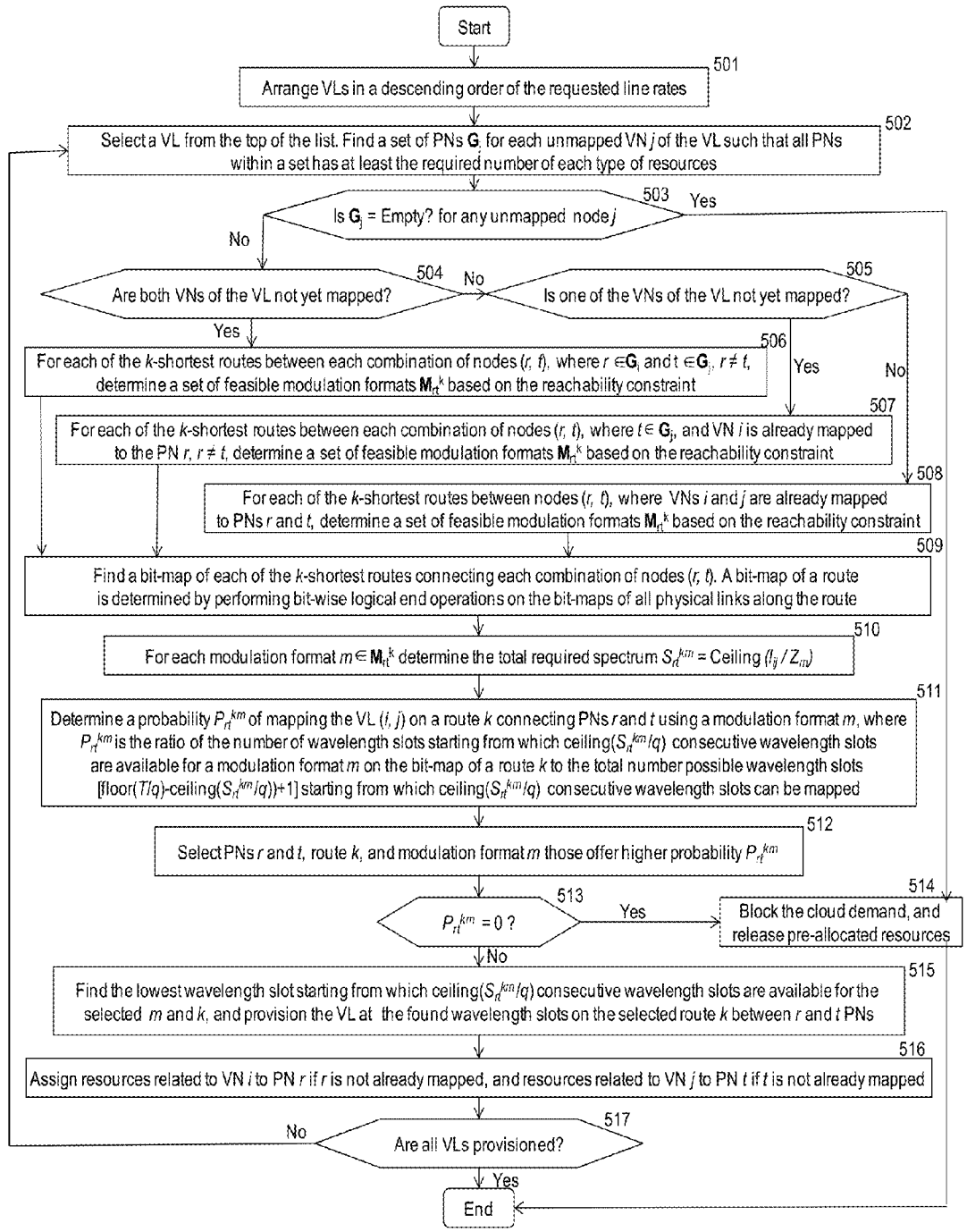
FIG. 4 shows an exemplary flowchart of a compute load balancing procedure.

FIG. 4 shows an exemplary flowchart of a compute load balancing procedure. To reduce the management complexity, the spectrum is slotted at the granularity of q GHz. A slot is referred to as a wavelength slot. Thus, spectrum can be represented by a set of consecutive wavelength slots, and among them, the first wavelength slot index is denoted as the wavelength of an optical channel. Thus, the network consists of total ceiling(T/q) wavelength slots [Note: ceiling(.) and floor(.) indicate ceiling and floor mathematical operations respectively over the value confined within a bracket]. The state of each wavelength slot is represented by a binary variable; '1' indicated that the wavelength slot is available and '0' indicates that the wavelength slot is occupied. The spectrum state of a fiber is represented by a binary vector that is referred to as a bit-map of a fiber.

The procedure pre-calculates up to k-shortest routes between each pair of nodes, where $k \leq |N|$. The procedure first maps virtual links (VLs) over physical links (PLs) while performing load balancing over network resources. The procedure first arranges the VLs of the cloud demand in a descending order of the requested line rates. A VL is selected from this ordered list one-by-one and mapped on the physical network. For the picked VL, the procedure finds a set of PNs $G_j$ for each unmapped VN j of the VL such that all PNs within a set has at least the required number of each type of resources requested by the VN j. If the set $G_j$ of any unmapped VN j is empty, then the procedure cannot map VN over any of the PNs, and blocks the cloud demand. On the other hand, if the sets $G_j$ of all unmapped VNs j are non-empty, then the procedure performs specific actions based on how many VNs of the selected VL are unmapped. If both the VNs of the selected VL are unmapped, then the procedure considers potential mapping of the VL over k-shortest routes connecting each combination of physical nodes (r, t), where $r \in G_i$ and $t \in G_j$, $r \neq t$, and finds a potential set of modulation formats $M_{rt}^k$ for each of the potential mapping on route k between physical nodes r and t based on the reachability constraint. On the other hand, if one of the VNs is already mapped to some of the PN, and the remaining VN is not yet mapped, then the procedure considers potential mapping of the VL over k-shortest routes connecting each combination of physical nodes (r, t), where r is the already mapped VN and $t \in G_j$ is the unmapped VN, where $r \neq t$, and finds a potential set of modulation formats $M_{rt}^k$ for each of the potential mapping on route k between physical nodes r and t based on the reachability constraint. On the other hand, if both of the VNs of the VL are already mapped, then the procedure considers potential mapping of the VL over k-shortest routes between nodes (r, t), where VNs i and j are already mapped to PNs r and t, and finds a potential set of modulation formats $M_{rt}^k$ based on the reachability constraint. In the next step, the procedure finds a bit-map of each of the k-shortest potential routes connecting each combination of physical nodes (r, t). A bit-map of a route is determined by performing bit-wise logical end operations on the bit-maps of all physical links along the route. The procedure also determines the required spectrum $S_{rt}^{km}$=Ceiling $(I_{ij}/Z_m)$ for each modulation format $m \in M_{rt}^k$. In the next step, the procedure finds the probability of mapping the VL over a potential route k connecting PNs r and t using modulation format $m \in M_{rt}^k$, denoted as $P_{rt}^{km}$. $P_{rt}^{km}$ is the ratio of the number of wavelength slots starting from which ceiling($S_{rt}^{km}$/q) consecutive wavelength slots are available for a modulation format m on the bit-map of a route k to the total number possible wavelength slots [floor (T/q)−ceiling($S_{rt}^{km}$/q))+1] starting from which ceiling($S_{rt}^{km}$/q) consecutive wavelength slots can be mapped. After evaluating combinations of all potential routes and modulation formats, the procedure selects a route and modulation format those maximize $P_{rt}^{km}$. If $P_{rt}^{km}$ is 0, then the procedure cannot map the VL on any of the routes using any of the modulation formats, and blocks the cloud demand after releasing all the pre-allocated resources. On the other hand, if is $P_{rt}^{km}$ non-zero, then the procedure finds the lowest wavelength slot starting from which ceiling($S_{rt}^{km}$/q) consecutive wavelength slots are available for the selected modulation format m and route k, and provisions the VL at the found wavelength slots on the selected route k and modulation format m between r and t PNs. Once the VL is mapped, the procedure maps the VNs at the both ends of the VL. The resources related to VN i are assigned to the PN r if r is not already mapped. Similarly, the resources related to VN j are assigned to the PN t if t is not already mapped. Finally, the procedure checks whether all VLs are provisioned or not. If at least one of the VLs is not yet provisioned, then the procedure repeats the procedure until all VLs are provisioned.

The detail procedure is described in terms of the flow chart as shown in FIG. 4. In 501, the procedure arranges VLs in a descending order of the requested line rates. In 502, the procedure selects a VL from the top of the list, and finds a set of PNs $G_j$ for each unmapped VN j of the VL such that all PNs within a set has at least the required number of each type of resources. In 503, the procedure checks whether $G_j$ is empty. If $G_j$ is empty, then the procedure follows Step 114, otherwise the procedure follows Step 504. In 504, the procedure checks whether both VNs of the VL are not yet mapped. If both the VNs of the VL are not yet mapped, then the procedure follows Step 106. On the other hand, if at least one of the VNs is already mapped, then the procedure follows Step 105. In 505, the procedure checks whether one of the VNs is already mapped while the other is not yet mapped. If this is true, then the procedure follows Step 107, otherwise, the procedure follows Step 508. In 506, for each of the k-shortest routes between each combination of nodes (r, t), where $r \in G_i$ and $t \in G_j$, $r \neq t$, the procedure determines a set of feasible modulation formats $M_{rt}^k$ based on the reachability constraint. In 507, for each of the k-shortest routes between each combination of nodes (r, t), where $t \in G_j$, and VN i is already mapped to the PN r, $r \neq t$, the procedure determines a set of feasible modulation formats $M_{rt}^k$ based on the reachability constraint.

In 508, for each of the k-shortest routes between nodes (r, t), where VNs i and j are already mapped to PNs r and t, the procedure determines a set of feasible modulation formats $M_{rt}^k$ based on the reachability constraint. In 509, the procedure finds a bit-map of each of the k-shortest routes connecting each combination of nodes (r, t). A bit-map of a route is determined by performing bit-wise logical end operations on the bit-maps of all physical links along the route. In 510, the procedure determines the total required spectrum $S_{rt}^{km}$=Ceiling $(I_{ij}/Z_m)$ for each modulation format $m \in M_{rt}^k$. In 511, the procedure determines a probability $P_{rt}^{km}$ of mapping the VL (i, j) on a route k connecting PNs r and t using a modulation format m, where $P_{rt}^{km}$ is the ratio of the number of wavelength slots starting from which ceiling ($S_{rt}^{km}$/q) consecutive wavelength slots are available for a modulation format m on the bit-map of a route k to the total number possible wavelength slots [floor(T/q)−ceiling($S_{rt}^{km}$/q))+1] starting from which ceiling($S_{rt}^{km}$/q) consecutive wavelength slots can be mapped. In 512, the procedure selects PNs r and t, route k, and modulation format m those offer higher probability $P_{rt}^{km}$. In 513, the procedure checks whether $P_{rt}^{km}$ is 0. If it is, then the procedure follows Step 514, otherwise it follows Step 515. In 514, the procedure blocks the cloud demand, and releases all the pre-allocated node and link resources. In 515, the procedure finds the lowest wavelength slot starting from which ceiling($S_{rt}^{km}$/q) consecutive wavelength slots are available for the selected m and k, and provision the VL at the found wavelength slots on the selected route k between r and t PNs. In 516, the procedure assigns resources related to VN i to PN r if r is not already mapped, and resources related to VN j to PN t if t is not already mapped. In 517, the procedure checks weather all VLs are mapped. If at least on the VLs is not yet mapped, then the procedure repeats step 502, otherwise it terminates.

Compute Followed by Network Load Balance—CNLB

The first heuristic algorithm is Compute followed by Network Load Balancing (CNLB), which can achieve the node load balance and network load balance at the same time. The virtual node mapping is solved first, followed by the virtual link mapping. In order to achieve the node load balance, the virtual nodes will first be sorted in a descending order according to their computing demands, and then be mapped to the physical nodes with the maximum ratio of available computing resource. In order to achieve the network load balancing, in the virtual link mapping process, k-shortest paths are calculated between each node pair and the probability of mapping the virtual link over each k-shortest path with different modulation formats is calculated (assuming the required number of spectrum slots for a candidate path and a candidate modulation format is q, the probability of mapping the virtual link over this candidate path with the candidate modulation format is the number of available q consecutive spectrum slots to the total number of q consecutive spectrum slots in the spectrum domain of a physical link). The path and modulation format with the highest probability will be selected, after which spectrum allocation is determined. The complexity of CNLB is max $(O(N_V*N_P), O(L_V))$. The pseudo code of CNLB is shown as follows.

Algorithm 1: CNLB

```
VirtualNodeMapping(r):
BEGIN
    FOR each virtual node VN_i (in descending order of the
        computing demands) from request r
        FOR each physical node PN_j (in descending order of the
            available computing resources)
            IF PN_j's available computing resources can satisfy
                VN_i's computing demands AND none of other VNs
                from the same virtual request r has been mapped to
                PN_j
                    Pre-map VN_i to PN_j; BREAK;
            END
        END
        IF VN_i cannot find a PN to be mapped to
            Block; Release the pre-map computing
            resources; BREAK;
        END
    END
END
/************************************************
******/
LinkMappingProbability(k, w):
BEGIN
    M = the maximum number of spectrum slots in a PL - w;
    (determine the maximum available number of spectrum
        chunk with w consecutive spectrum slots)
    Find the joint available spectrum slots J in all the PLs
along
        route k;
    A = the number of available spectrum chunk with w
        consecutive spectrum slots in J;
        RETURN A/M;
END
```

Algorithm 1: CNLB
-continued

```
/************************************************
******/
VirtualLinkMapping(r):
BEGIN
    FOR each virtual link VL_i (in descending order of the
        bandwidth demands) from request r
        Based on the pre-map results from
        VirtualNodeMapping(r), determine the routes for
VL_i by
            using K-ShortestPath( );
            FOR each path k in the k-shortest paths of VL_i
                Calculate the transmission distance of the path;
                Determine the modulation format by considering
the
                    distance and reach constraint;
                Determine the spectrum slots width w based on
the
                    modulation format and the bandwidth demand
of VL_i;
                LinkMappingProbability(k, w);
            END
            IF the maximum of LinkMappingProbability(k, w) >
0
                Assign enough spectrum slots to the VL_i with
                corresponding route and modulation format
starting
                    from the lowest available spectrum slot;
            ELSE
                Block++; Release all the pre-map/assign
                resource; BREAK;
            END
    END
END
```

Network Followed by Compute Load Balance—NCLB

Instead of following the traditional way of solving virtual node mapping in the first phase and solving the virtual link mapping in the second phase, we inverse the order of these two phases and propose a novel heuristic called Network followed by Computing Load Balancing (NCLB). In NCLB, when a virtual infrastructure request comes, virtual link mapping is solved first. Virtual links are first sorted in a descending order according to their bandwidth demand. For a particular virtual link, NCLB first finds all the possible physical node pairs that have enough computing resource to serve the two virtual nodes (or one virtual node which is not yet mapped) attached to this virtual link and consider these node pairs as candidates. For each candidate node pair, apply the CNLB heuristic and record the mapping probability for each candidate pair. Among all the candidate node pairs and their according path and modulation format, the one with the highest mapping probability is selected as the virtual link mapping decision. After the virtual link mapping is finished, the virtual node mapping is working in a way that, between the two virtual nodes and two physical nodes, the virtual node with a higher computing demand is mapped to the physical node with a higher availability ratio and the other virtual node will be mapped to the other physical node. The complexity of NCLB is $O(L_V*N_P^2)$. The detailed steps of NCLB are shown as follows.

Algorithm 2: NCLB

```
LinkMappingProbability(k, w):
BEGIN
    M = the maximum number of spectrum slots in a PL - w;
    (determine the maximum available number of spectrum
```

```
Algorithm 2: NCLB chunk with w consecutive spectrum slots)
    Find the joint available spectrum slots J in all the PLs
along
    route k;
    A = the number of available spectrum chunk with w
    consecutive spectrum slots in J;
        RETURN A/M;
    END
    /************************************************
******/
    CheckPhysicalNodeResource(s, d):
    BEGIN
        IF the available computing resources of s and d can
satisfy
        VL$_i$'s two VNs' computing demands AND none of
        other VNs from the same virtual request r has been
        mapped to s and d
            RETURN true;
        END
    END
    /************************************************
******/
    VirtualNetworkEmbedding(r):
    BEGIN
    FOR each virtual link VL$_i$ (in descending order of the
    bandwidth demand)
        FOR each physical node s in PNs
            FOR each physical node d in PNs
                IF CheckPhysicalNodeResource(s, d)
                Determine the route[s][d] using K-
ShortestPath( );
                    FOR each path k in the k-shortest paths
                        Calculate the transmission distance of
path k;
                        Determine the modulation format
considering
                        the distance and reach constraint;
                        Determine the spectrum slots width w
based on
                        the modulation format and the bandwidth
                        demand of VL$_i$;
                            LinkMappingProbability(k, w);
                        END
                    Find the maximum of
                    LinkMappingProbability(k, w) for candidate
node
                    pair (s, d), denoted by Probability(s, d)
                END
            END
        IF the maximum of Probability(s, d) > 0
            Pre-map VL$_i$ to the PLs along the
            corresponding route;
            Assign enough spectrum slots to the VL$_i$ with
            corresponding route and modulation format
starting
            from the lowest available spectrum slot;
            Pre-map the two end virtual nodes of VL$_i$ to s and
d;
        ELSE
            Block; BREAK;
        END
    END
END
```

Shortest-Path Based Embedding

The baseline heuristic, the Shortest-Path Based Embedding (SPBE) algorithm, is presented as a comparison with CNLB and NCLB. When a new virtual infrastructure request comes, the baseline heuristic solves the virtual node mapping first, and followed by the virtual link mapping. In order to achieve the node load balancing, the virtual nodes will first be sorted in a descending order according to their node resource demand, and then be mapped to the physical node with the maximum ratio of available node resource. After all the virtual nodes are mapped, the route of each virtual link is determined by calculating the shortest path between two physical nodes that the virtual nodes are mapped to. Based on the link distance and the reach constraint of different modulation level, an appropriate modulation format is selected. A set of continuous spectrum slots are assigned to each virtual link along its physical route, taking into consideration of the spectrum continuity constraint.

What is claimed is:

1. A method for providing cloud embedding using Network followed by Compute Load Balancing (NCLB), comprising:
    mapping one or more virtual links over one or more physical links while balancing network resources, and
    mapping one or more virtual nodes over one or more physical nodes while balancing different types of computational resources; and
    mapping virtual links (VLs) over a physical links of a sub-network while performing load balancing over network resources, wherein for each VL (i, j), estimating a required amount of spectral resources $f_{ij}$, defined as the product of the shortest distance in terms of hops $d_{ij}$ between physical nodes (PNs) over which i and j Virtual Nodes (VNs) are mapped, and a minimum required spectrum $A_{ij}$, determined from a spectral efficient modulation format to reach at least $h_{ij}$ distance, where $h_{ij}$ is a physical distance between VNs i and j, and arranging the VLs in a descending order of an estimated required spectrum.

2. The method of claim 1, comprising mapping virtual links first followed by mapping of virtual nodes.

3. The method of claim 1, comprising finding potential modulation formats and routing solutions for a VL mapping.

4. The method of claim 1, comprising selecting a modulation format and a physical routing solution for a VL based on the probability of mapping the VL over the route using the modulation format.

5. The method of claim 1, comprising assigning a wavelength and allocating spectrum to a VL.

6. The method of claim 1, comprising mapping virtual nodes over physical nodes.

7. The method of claim 1, comprising finding potential modulation formats and routing solutions for a VL mapping.

8. The method of claim 1, comprising selecting a modulation format and a physical routing solution for a VL based on the probability of mapping the VL over the route using the modulation format.

9. The method of claim 1, comprising assigning a wavelength and allocating spectrum to a VL.

10. The method of claim 1, wherein a wavelength and a spectrum are assigned to a VL such that spectral fragmentation is minimized and improves likelihood of mapping VLs over physical routes.

11. The method of claim 1, comprising assigning virtual nodes associated with the mapped virtual links to end physical nodes of a selected physical route on which the virtual link is mapped.

* * * * *